US011900742B1

(12) United States Patent
Kloepfer et al.

(10) Patent No.: US 11,900,742 B1
(45) Date of Patent: Feb. 13, 2024

(54) TECHNIQUES FOR DYNAMICALLY MANAGING A GUN COMPONENT

(71) Applicant: Biofire Technologies Inc., Broomfield, CO (US)

(72) Inventors: Kai Thorin Kloepfer, Denver, CO (US); Bryan Edward Rogers, Aurora, CO (US); Christopher James Owens, Denver, CO (US); Jack Hugo Thiesen, Firestone, CO (US); Benjamin William Dwyer, Golden, CO (US); Donna Kelley, Louisville, CO (US); Timothy Joel Thorson, Castle Rock, CO (US)

(73) Assignee: Biofire Technologies Inc., Broomfiled, CO (US)

( * ) Notice: Subject to any disclaimer, the term of this patent is extended or adjusted under 35 U.S.C. 154(b) by 65 days.

(21) Appl. No.: 17/661,000

(22) Filed: Apr. 27, 2022

Related U.S. Application Data

(60) Provisional application No. 63/180,547, filed on Apr. 27, 2021.

(51) Int. Cl.

| | |
|---|---|
| ***G07C 9/00*** | (2020.01) |
| ***F41A 17/06*** | (2006.01) |
| ***F41A 9/62*** | (2006.01) |
| ***F41G 1/35*** | (2006.01) |
| ***F41G 1/34*** | (2006.01) |

(52) U.S. Cl.
CPC ........ *G07C 9/00563* (2013.01); *F41A 17/063* (2013.01); *F41A 17/066* (2013.01); *F41A 9/62* (2013.01); *F41G 1/345* (2013.01); *F41G 1/35* (2013.01)

(58) Field of Classification Search
CPC ...... G07C 9/00563; F41A 17/066; F41A 9/62; F41G 1/345; F41G 1/35
See application file for complete search history.

(56) References Cited

U.S. PATENT DOCUMENTS

| | | | | |
|---|---|---|---|---|
| 6,094,850 | A * | 8/2000 | Villani | F41A 9/62 42/49.01 |
| 2017/0293749 | A1* | 10/2017 | Baek | G06F 1/3265 |
| 2018/0363934 | A1* | 12/2018 | Vie | F24F 11/52 |
| 2019/0376755 | A1* | 12/2019 | Teetzel | F41A 17/066 |

* cited by examiner

*Primary Examiner* — Laura A Gudorf
(74) *Attorney, Agent, or Firm* — Perkins Coie LLP; Andrew T. Pettit

(57) ABSTRACT

The present disclosure provides systems and techniques for dynamically operating a peripheral component of a gun, such as a flashlight, an electronic sight, or a haptic motor. The gun may perform an authentication procedure to identify a user operating the gun, retrieve a configuration file from memory housed in the gun in response to the authentication procedure, and perform a function at the peripheral component based on the configuration file indicating that the function is to be performed for the user. The gun may collect authentication data, such as biometric data or token data, and the gun may identify the user operating the gun based on the authentication data. The user operating the gun may be identified in response to matching the collected authentication data to authentication data stored in the memory, and the gun may determine the function based on the configuration file indicating the function for the user.

25 Claims, 13 Drawing Sheets

TECHNIQUES FOR DYNAMICALLY MANAGING A GUN COMPONENT

CROSS-REFERENCE TO RELATED APPLICATIONS

This application claims priority to U.S. Provisional Application No. 63/180,547, titled "DYNAMIC GUN COMPONENT" and filed on Apr. 27, 2021, which is incorporated by reference herein in its entirety.

FIELD OF TECHNOLOGY

The teachings disclosed herein generally relate to guns, and more specifically to guns that include electronic components.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein support dynamic gun components. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the described systems and techniques described herein provide components of a gun that may be operated in a dynamic manner. The gun may perform an authentication procedure to identify a user that intends to operate the gun. Authentication data may be collected as part of the authentication procedure, and the user may be identified based on the collected authentication data matching authentication data stored in the memory of the gun. A configuration file may be retrieved from the memory in response to the authentication procedure, and a function may be performed at a peripheral component based on the configuration file indicating that the function is to be performed for the user. Further, the user may be permitted to operate the gun in response to a determination that the collected authentication data (e.g., query data) matches the authentication data (e.g., enrollment data) stored in the memory of the gun.

Figure 1:
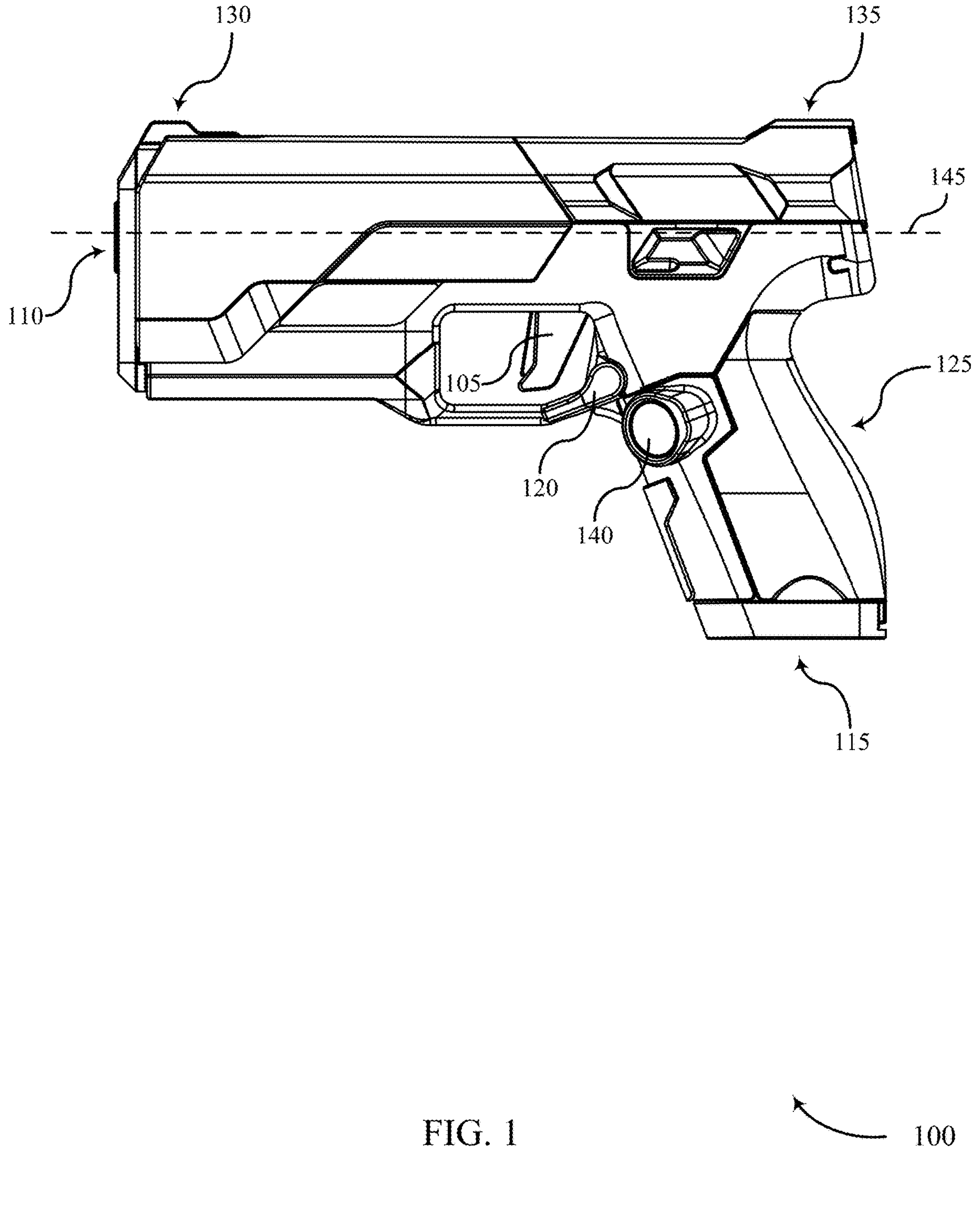
FIG. 1 illustrates an example of a gun that is capable of dynamically operating peripheral components in accordance with aspects of the present disclosure.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some conventional guns include peripheral components, such as laser sights or flashlights, that can be operated by a user. As an example, a gun may include a laser sight that projects a visible beam of light to help the user quickly and reliably aim the gun, and the laser may include a power button that is manually pressed to toggle the laser on and off. In other words, the user may press the power button to turn the laser on, and the user may press the power button again to turn the laser off The power button provides flexibility as it allows the user to manually operate the laser, but manually operating the laser may create a distraction and draw the attention of the user away from impending threats. Requiring that the power button be manually operated may also result in the user forgetting to turn the laser off, leading to unintended power consumption that can affect the usefulness of the gun. Simply put, the laser may not be operable when needed if the user forgets to turn the laser off In another example, a gun may include a display panel that provides important information to the user. The display panel may provide minimal information, extensive information, or no information to the user, and the user may modify the display panel to show more or less information. For example, one user may prefer the display panel to be powered off while operating the gun, but another user may prefer the display panel to show both a battery icon indicating the amount of battery charge remaining and a number icon indicating the number of cartridges (also referred to as "rounds") remaining in the gun.

Manually operating peripheral components of a gun is often a tedious process that draws the attention of the user holding the gun away from potential threats. Additionally, environmental conditions may change, and the user may desire peripheral components that are capable of automatically adjusting in response to the changing environment. For example, the user may desire the display panel of the gun to be bright when in a light environment and dim when in a dark environment. Conventional systems and techniques fail to provide gun components that can automatically respond to events, such as user events and environmental events.

Introduced here, therefore, are gun components that operate dynamically in response to a stimulus. The systems and techniques described herein allow peripheral gun components to perform functions in response to both user events and environmental events, such as a user picking up the gun or a change in lighting conditions. As an example, the gun may be an electromechanical gun that unlocks in response to authenticating the identity of a user and turns on a peripheral component based on the identity of the user. As part of a configuration procedure (also called an "initiation procedure"), the gun may be configured to (i) turn on a flashlight in response to authenticating a first user and (ii) turn on a laser but not the flashlight in response to authenticating a second user. In other words, the gun can be customized to behave in a preconfigured manner based on the identity of the user holding the gun.

In some examples, the gun may further modify a function performed at a peripheral component based on sensor input. For example, the gun may include an ambient light sensor, and the gun may increase the brightness of a laser sight in response to determining that the amount of ambient light is above a first threshold (also called an "upper threshold"), and the gun may decrease the brightness of the laser sight in response to determining that the amount of ambient light is below a second threshold (also called a "lower threshold"). The term "peripheral component" generally refers to a component that can function independently from a firing mechanism of the gun. A peripheral component may be removably attached to the gun, or a peripheral component may be an integrated aspect of the gun that is capable of functioning independently from the firing mechanism of the gun. Examples of peripheral components include a laser sight, a holographic sight, a light source, a display panel, a speaker, and a haptic motor.

A user may configure or personalize the manner in which a peripheral component operates via a user interface, such as a user interface of the gun, a user interface of a docking station (also referred to as a "dock"), or a user interface of a user device. Examples of user devices include computers, tablets, smartphones, and wearable electronic devices. The user may configure the behavior of a peripheral component by providing user input at a user interface. For example, the user may press touch-sensitive buttons to configure which functions are performed by which peripheral components, the conditions under which functions are to be performed by peripheral components, etc.

The systems and techniques described herein allow peripheral components of a gun to perform functions dynamically in response to user events and environmental events. Being able to configure aspects of a gun to function according to the preferences of a user reduces distractions and allows the user to focus on impending threats. Additionally, some electromechanical guns are unlocked in response to authenticating the identity of the user holding the gun, and such electromechanical guns can save a configuration of component behavior for each user, thereby allowing users to configure the gun without forcing other users of the gun to use the same configuration. As such, a single electromechanical gun may automatically function according to the preferences of multiple users. For example, some users may prefer the gun to operate in a stealthy fashion by default, where the gun generates little or no visible light, while other users may prefer the gun to automatically turn on a laser sight to aid in aiming the gun. The systems and techniques described herein allow the gun to determine the preferences of the user operating the gun and perform functions at peripheral components based on the preferences of the user operating the gun.

Embodiments may be described in the context of executable instructions for the purpose of illustration. For example, a processor housed in a gun may be described as being capable of executing instructions that allow peripheral components of the gun to function automatically based on user events, environmental events, or both. However, those skilled in the art will recognize that aspects of the technology could be implemented via hardware, firmware, or software.

Terminology

References in the present disclosure to "an embodiment" or "some embodiments"means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the terms "comprise," "comprising,"and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that is capable of dynamically operating peripheral components in accordance with aspects of the present disclosure. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an inertial measurement unit (IMU) configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to described data that is used to authenticate a user. For example, the gun 100 may collect authentication data from the user to determine that the user is authorized to operate the gun 100, and the gun 100 may be unlocked in based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may support various types of aiming sights (or simply "sights"). At a high level, a sight is an aiming device that may be used to assist in visually aligning the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights—namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED). The front sight 130 and the rear sight 135 may be examples of peripheral components that can be operated in a dynamic fashion in response to user events, such as a user picking up the gun 100, or environmental events, such as a change in lighting conditions.

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The gun 100 supports dynamically operating peripheral components, such as the front sight 130, the rear sight 135, a display panel, a haptic motor, a speaker, a laser, a flashlight, and the like. The gun 100 may perform an authentication procedure to identify a user operating the gun 100. For example, the biometric sensor 140 may collect fingerprint data from the user, and the fingerprint data may be used to identify the user operating the gun 100. As another example, a wireless communication circuit of the gun 100 may collect token data from the user, and the token data may be used to identify the user operating the gun 100. Token data may include a digital signature used to identify a user. As an illustrative example, the wireless communication circuit of the gun 100 may implement a radio-frequency identification (RFID) protocol to collect the digital signature from an RFID tag that is in possession of the user. The user operating the gun 100 may be identified based on matching the collected authentication data to authentication data stored in the memory.

The gun 100 may retrieve a configuration file from memory in response to the authentication procedure and perform a function at the peripheral component based on the configuration file indicating that the function is to be performed for the user. The memory storing the configuration file may be located inside the gun 100, such as on a circuit board that is housed within an electronics module of the gun 100. The gun 100 may determine the function based on the configuration file indicating the function for the user.

Figure 2:
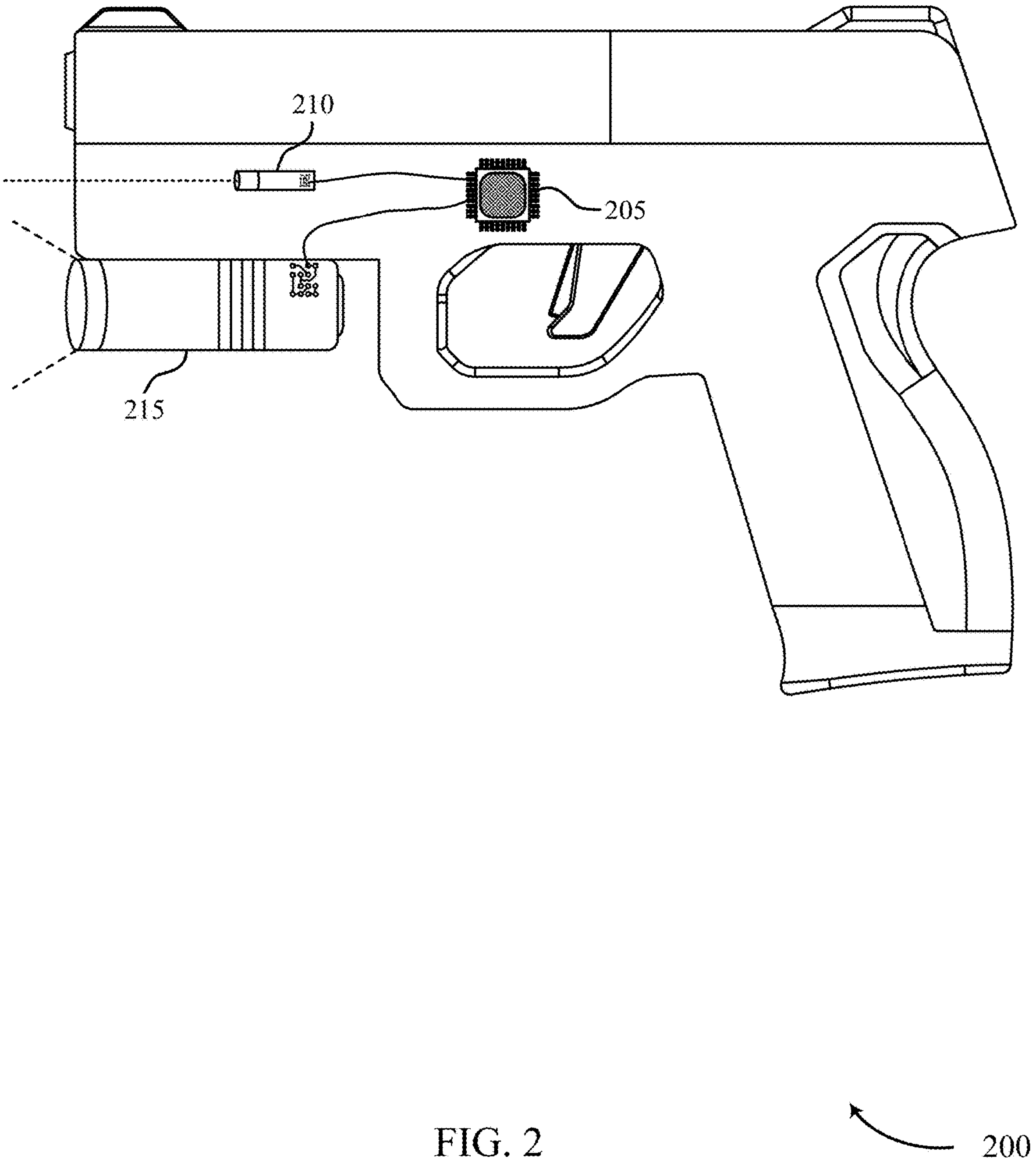
FIG. 2 illustrates an example of a gun that dynamically operates a laser sight and a flashlight.

FIG. 2 illustrates an example of a gun 200 that dynamically operates peripheral components in accordance with aspects of the present disclosure. The gun 200 may be an example of the gun 100 as described with reference to FIG. 1, and the gun may operate a laser sight 210 and/or a flashlight 215 in a dynamic manner. The laser sight 210 and the flashlight 215 are examples of light emitting devices.

The gun 200 includes a component manager 205 which may be an example of a processor or a controller. The gun 200 also includes a laser sight 210 and a flashlight 215, which are examples of peripheral components. The component manager 205 may dynamically operate the laser sight 210 and the flashlight 215 based on user events, based on environmental events, or both. As an illustrative example, the component manager 205 may identify a user event, retrieve a configuration file from memory in response to the user event, and power on the laser sight 210 based on the configuration file indicating that the function is to be performed. The user event may be a user authentication event that identifies the identity of the user holding the gun 200, and the component manager 205 may determine that the laser sight 210 is to be turned on for the user based on the configuration file indicating that the user prefers the laser sight 210 to turn on automatically. In other words, the laser sight 210 may turn on without the user manually toggling a power button of the laser sight 210.

The flashlight 215 may be powered on in response to a different user operating the gun 200. For example, the gun 200 may identify a second user and determine that the second user prefers the gun 200 to power on the flashlight 215. The gun 200 may determine that the second user prefers the flashlight 215 to be powered on based on the configuration file indicating that the flashlight 215 is to be powered on for the second user. The configuration file may be created or updated as part of a configuration procedure.

A user may configure the behavior of peripheral components of the gun 200, such as the laser sight 210 or the flashlight 215, as part of a configuration procedure (also referred to as an "initiation procedure"). Users may provide user input via a user interface to indicate the preferred behavior of the peripheral components. The user interface may present a menu that allows the users to configure the default behavior of the laser sight 210 and the flashlight 215.

For example, a first user may toggle a flashlight setting (e.g., a radio button, a toggle switch, etc.) of the user interface to indicate a preference for the flashlight 215 to be powered on when using the gun 200, and a second user may toggle a laser setting of the user interface to indicate a preference for the laser sight 210 to be powered on when using the gun 200. As part of the configuration procedure, the component manager 205 may modify a configuration file to indicate that the first user prefers the flashlight 215 to be powered on when operating the gun and that the second user prefers the laser sight 210 to be powered on when operating the gun. The configuration file may be structured according to a file type, such as an Extensible Markup Language (XML) file type, a JavaScript Object Notation (JSON) file type, or the like.

The gun 200 may perform a user authentication procedure to identify the user operating the gun 200 and perform a function at a peripheral component of the gun 200 based on which user is operating the gun 200. As part of the user authentication procedure the gun 200 may collect authentication data and determine that the collected authentication data matches stored authentication data corresponding to a user that is enrolled to operate the gun 200. Authentication data may include biometric data, such as fingerprint data, palmprint data, vein pattern data, facial data, iris data, retina data, voice data, or impedance data, or token data, such as a digital identifier receive red as through a Near Field Communication (NFC) protocol, a Bluetooth protocol, or a Wi-Fi® protocol. Authentication data may be referred to as "query data" when collected as part of a user authentication procedure, and authentication data may be referred to as "enrollment data" when collected as part of a user enrollment procedure. The gun 200 may identify a user profile associated with the enrollment data that matches the query data, and the component manager 205 may perform a function at the laser sight 210 and/or the flashlight 215 based on the configuration file indicating a function to perform at the laser sight 210 and/or the flashlight 215 for the user profile. A user profile may be an aspect of a configuration file.

The laser sight 210 and the flashlight 215 are examples of peripheral components, but it should be understood that the gun 200 may include additional or alternative peripheral components.

Figure 3:
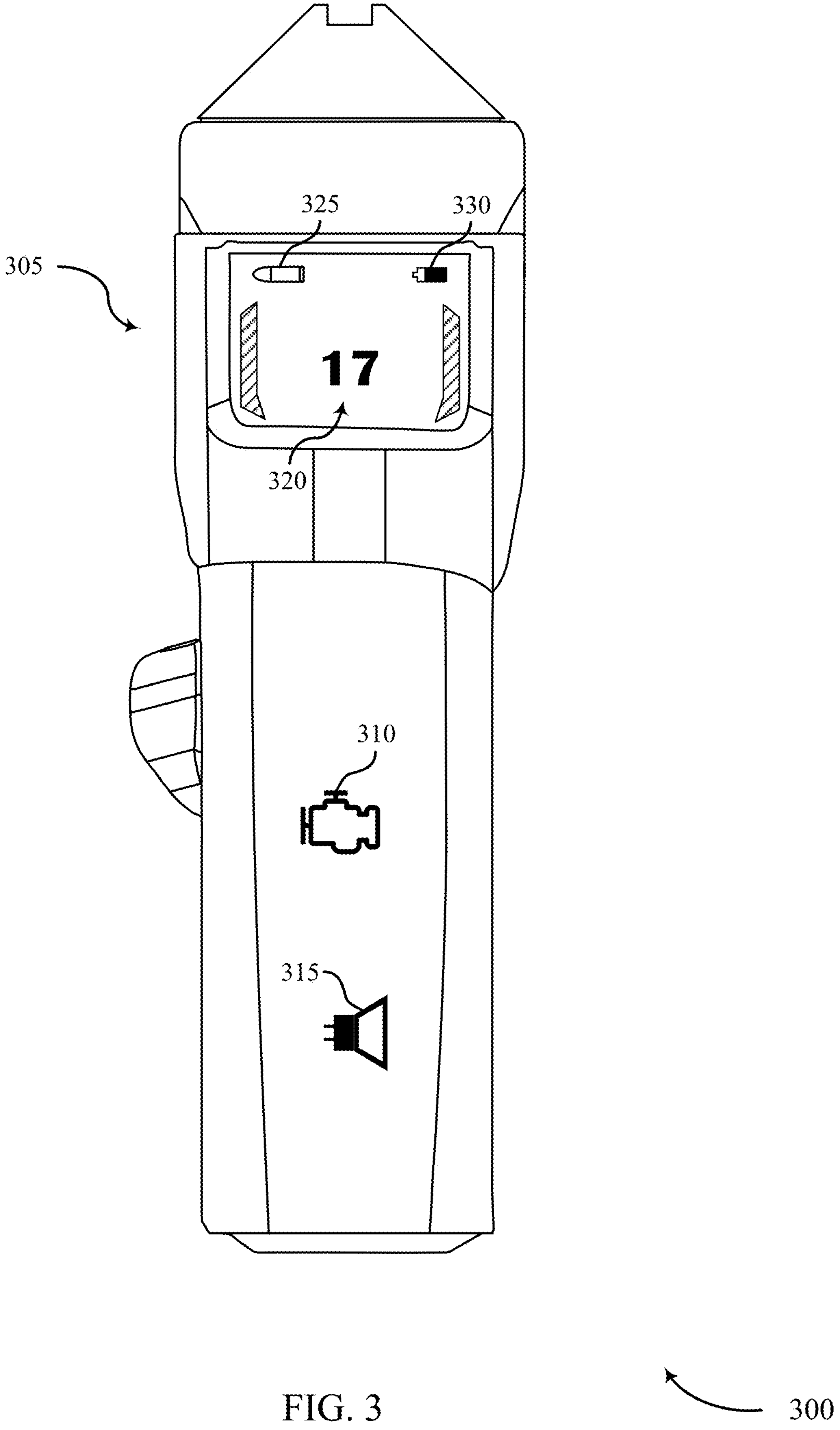
FIG. 3 illustrates an example of a gun including multiple peripheral components.

FIG. 3 illustrates an example of a gun 300 that dynamically operates peripheral components in accordance with aspects of the present disclosure. The gun 300 includes multiple examples of peripheral components that may be operated in a dynamic manner.

The gun 300 includes a display panel 305, a haptic motor 310, and a speaker 315, which are examples of peripheral components which may perform functions. For example, the display panel 305 may display an icon, the haptic motor 310 may generate a haptic pulse, or the speaker 315 may generate a sound. The gun 300 may be configured to generate a haptic pulse at the haptic motor 310 based on the gun 300 authorizing a first user to operate the gun 300, and the gun 300 may generate a haptic pulse at the haptic motor 310 and generate a tone at the speaker 315 based on the gun 300 authorizing a second user to operate the gun 300. As another example, a first user may configure the gun 300 to generate a haptic pulse consisting of two short pulses to indicate that the gun 300 is unlocked (e.g., armed or ready to fire), and a second user may configure the gun 300 to generate a haptic pulse consisting of one long pulse to indicate that the gun 300 is unlocked. The gun may perform an authentication procedure based on query data (e.g., authentication data received as part of a user authentication procedure), determine the identity of the user operating the gun 300 based on the query data matching enrollment data (e.g., authentication data received as part of a user enrollment procedure), and generate a haptic pulse at the haptic motor 310 based on the identity of the user. The gun will generate a haptic pulse consisting of two short pulses based on the identity of the user corresponding to the first user, and the gun will generate a haptic pulse consisting of one long pulse based on the identity of the user corresponding to the second user.

The display panel 305 may display icons, such as the number icon 320, the cartridge icon 325, or the battery icon 330. The number icon 320 may be used to indicate the number of cartridges present in the gun 300, the cartridge icon 325 may be used to indicate whether the gun is loaded (e.g., whether a magazine is in a magazine well of the gun, whether a cartridge is in a breech of the gun, etc.), and the battery icon 330 may be used to indicate the amount of battery charge remaining in a battery pack of the gun. The display panel 305 may be a flexible display panel or a rigid display panel. The display panel 305 may be an example of, or display elements of, a user interface. The display panel 305 is an example of a peripheral component. In some examples, the display panel 305 may be used to collect user input as part of a configuration procedure. In some additional or alternative examples, a user interface of a docking station or a user interface of a user device may be used to collect user input as part of the configuration procedure.

A configuration procedure may be performed to define or otherwise configure the behavior of the peripheral components of the gun 300. A user may define the behavior of a peripheral component for different contexts. For example, a user may define a function that is to be performed for all users operating the gun, the user may define a function that is to be performed when a particular user is operating the gun, the user may define a function that is to be performed for all users operating the gun in a particular environmental condition, or the user may define a function that is to be performed when a particular user is operating the gun in a particular environmental condition. The user may define the function and the gun 300 may determine the peripheral component to perform the function, or the user may define the function and the peripheral component that is to perform the function. As an illustrative example, the user may configure the display panel 305 to show the battery icon 330 for all users operating the gun 300, and the user may configure the haptic motor 310 to generate a haptic pulse when a particular user is operating the gun 300. The user may provide user input indicating that the display panel 305 is to display the cartridge icon 325 to indicate a loaded status, or the user may provide user input indicating a preference for the gun 300 to indicate a loaded status and the gun 300 may determine that the display panel 305 is to display the cartridge icon 325 when the gun 300 is loaded. In other words, as part of the configuration procedure, the user may provide user input indicating a function, user input indicating a peripheral component, or user input indicating a peripheral component that is to perform a function.

The user may provide authentication data to the gun 300, and the configuration procedure may be performed based on the gun 300 determining the identity of the user. For example, the user may provide a fingerprint to a fingerprint scanner of the gun 300, the gun 300 may determine the identity of the user based on the fingerprint, the gun 300 may determine a permission level based on the identity, and the configuration procedure may be performed based on the permission level satisfying a permission threshold. The configuration procedure may be performed based on the permissions level, or aspects of the configuration procedure may be allowed/disallowed based on the permission level. As an example, the user may be associated with a "user" permission level that allows the user to configure the behavior of the peripheral components of the gun for the user, or the user may be associated with an "owner" permission level that allows the user to configure the behavior of the peripheral components of the gun for any user of the gun. The configuration file may be modified to configure the behavior of a peripheral component based on a user associated with the "user" permission level defining the behavior of the peripheral component for the user, and the configuration file may be modified to configure the behavior of a peripheral component based on a user associated with the "owner" permission level defining the behavior of the peripheral component for any user. As an illustrative example, a user associated with the "owner" permission level may configure the behavior of peripheral components of the gun 300 for any user, but a user associated with the "user" permission level may configure the behavior of peripheral components of the gun 300 for just themself. In some examples, a user associated with the "user" permission level may not be allowed to configure the behavior of peripheral components of the gun 300. A user may define the behavior of a peripheral component by selecting an item in a menu, selecting a radio button, pressing a toggle switch, or performing another action through a user interface.

Figure 4:
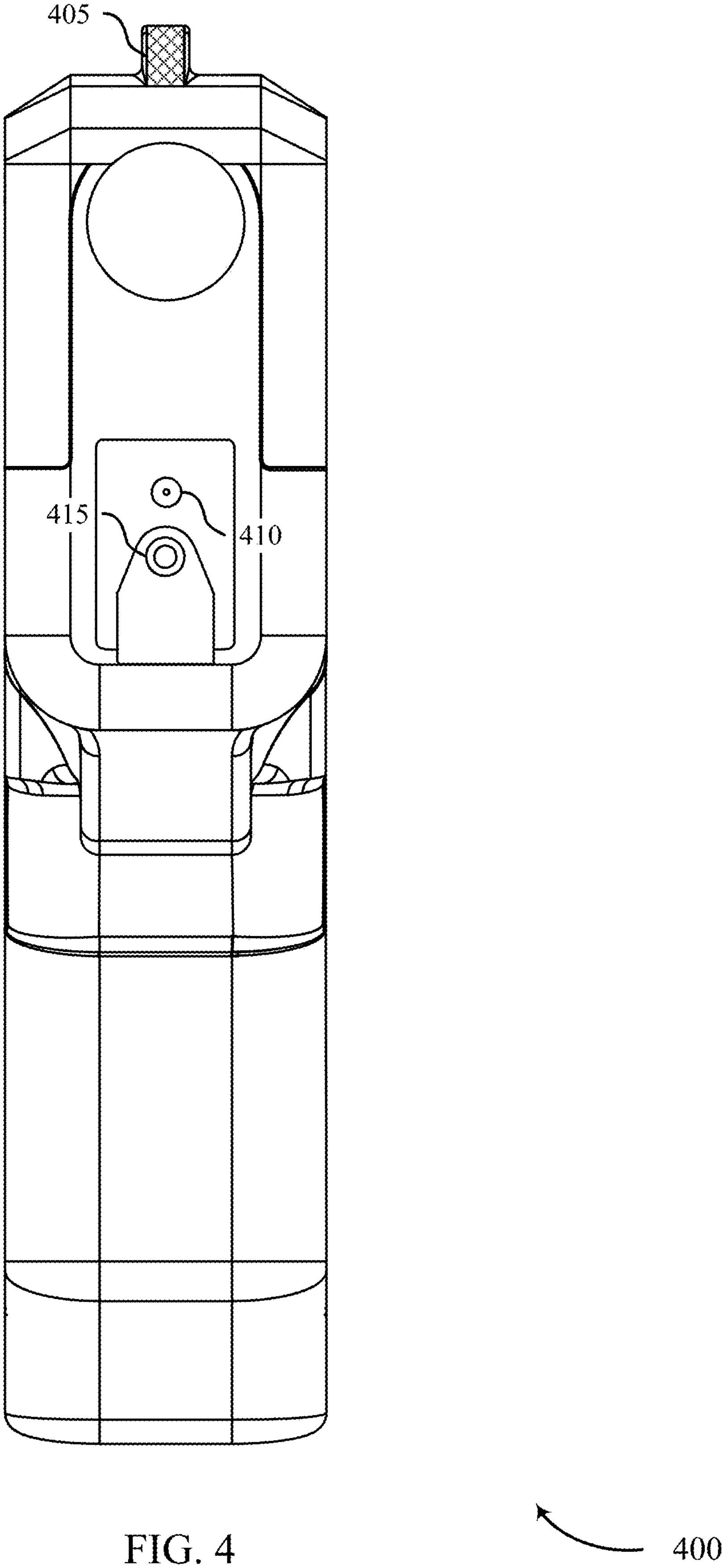
FIG. 4 illustrates an example of a gun including multiple peripheral components.

FIG. 4 illustrates an example of a gun 400 that dynamically operates peripheral components in accordance with aspects of the present disclosure. The gun 400 includes an aiming sight 405, a laser sight 410, and a flashlight 415, which are examples of peripheral components that may be operated in a dynamic manner. The aiming sight 405 may be an example of an electronic aiming sight including an LED that can be configured to illuminate with a predetermined color of light, according to a light pulse pattern, or according to a brightness value.

A user may configure the gun 400, and the peripheral components of the gun 400 may perform functions based on the configuration. In some examples, a user may configure the aiming sight 405 to illuminate with a color of light when the gun 400 is being operated by the user. For example, a first user many configure the gun 400 to illuminate the aiming sight 405 with red light to indicate that the gun 400 is unlocked, and a second user may configure the gun 400 to illuminate the aiming sight 405 with green light to indicate that the gun 400 is unlocked. The gun 400 may determine which user is operating the gun 400 based on a user authentication procedure identifying the user operating the gun 400. As part of the user authentication procedure, the user may provide query data (e.g., authentication data), and the gun 400 may identify the user operating the gun 400 based on the query data matching enrollment data (e.g., previously-collected authentication data).

As another example, a first user may configure the gun 400 to refrain from powering on the laser sight 410 or the flashlight 415, and a second user may configure the gun 400 to power on the laser sight 410 and the flashlight 415 in response to picking up the gun 400, powering up the gun, supplying biometric data to the gun, or supplying token data to the gun. The biometric data may be based on a biometric feature, such as a fingerprint, a facial structure, or a vein pattern, while the token data may be based on a ring, a watch, or a device containing a digital signature.

The aiming sight 405, the laser sight 410, and the flashlight 415 are examples of peripheral components, but it should be understood that the gun 400 may include additional or alternative peripheral components.

Figure 5:
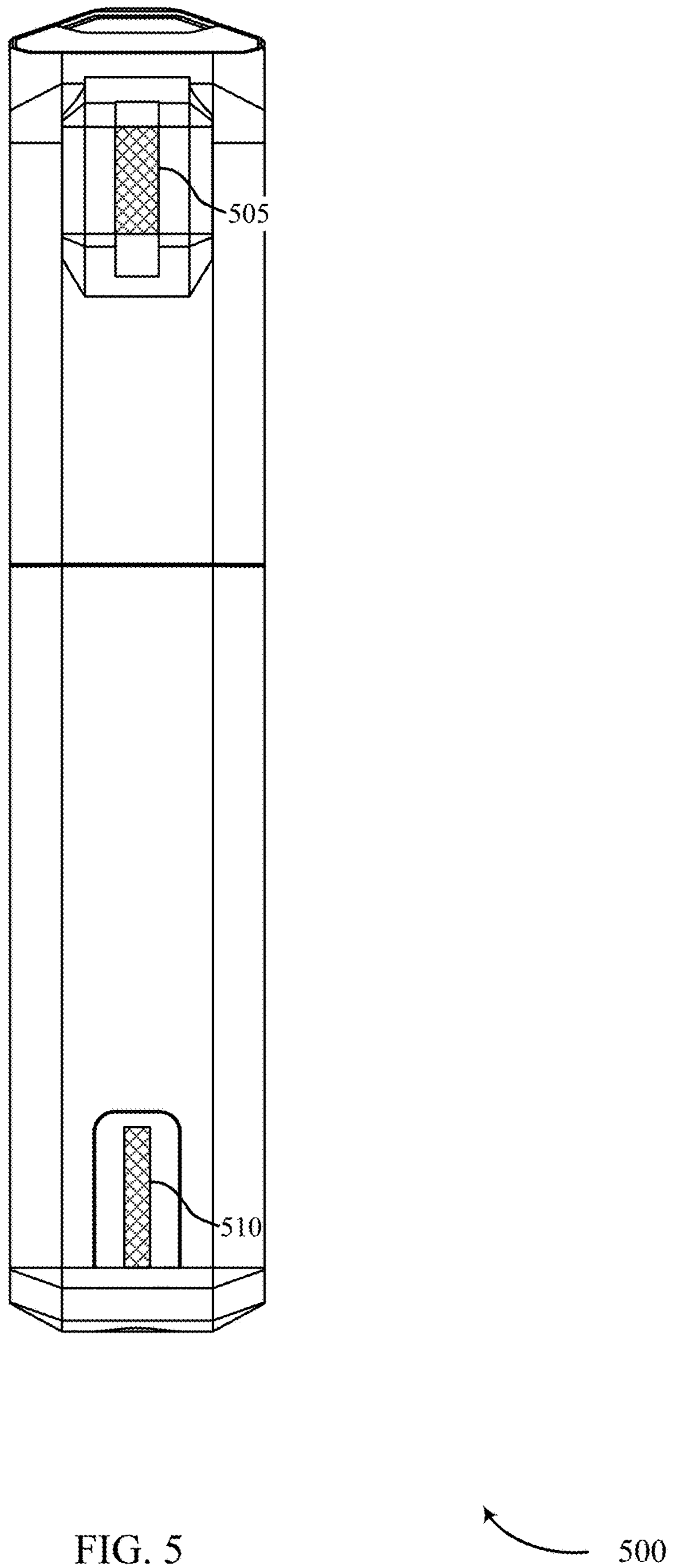
FIG. 5 illustrates an example of a gun that dynamically operates a sight.

FIG. 5 illustrates an example of a gun 500 that dynamically operates peripheral components in accordance with aspects of the present disclosure. The gun 500 may operate one or more sights in a dynamic manner.

Figure 6:
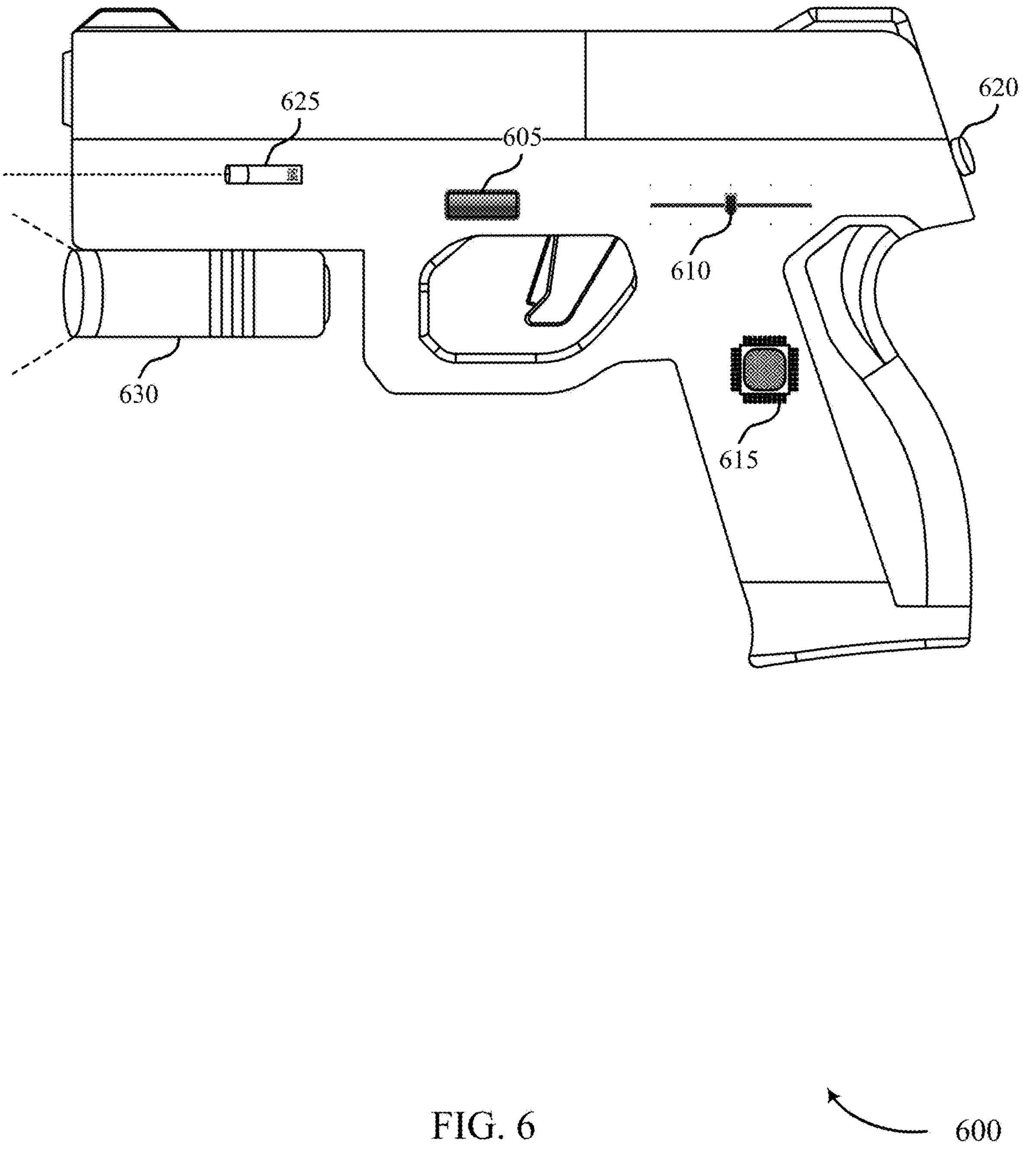
FIG. 6 illustrates an example of a gun including peripheral components that can perform functions in response to sensor input or user input.

The gun 500 includes a front sight 505 and a rear sight 510. The front sight 505 and/or the rear sight 510 may be referred to as "aiming sights" or simply as "sights." The front sight 505 and/or the rear sight 510 are examples of peripheral components. A peripheral component may perform a function in response to a stimulus, such as an output generated by a user authentication procedure, an output generated by an ambient light sensor, a user input generated by a user pressing a button, or any combination thereof FIG. 6 illustrates an example of a gun 600 that dynamically operates peripheral components in accordance with aspects of the present disclosure. Peripheral components of the gun 600 may perform functions in response to sensor input and/or user input.

The gun 600 includes a button 605 and a slider 610, which may be aspects of a user interface that can be used to collect user input from a user of the gun 600. The gun 600 also includes a processor 615 which may implement aspects of a component manager. The gun 600 includes an ambient light sensor 620 which may generate an output, and the laser sight 625 and/or the flashlight 630 may modify a function based on the output. It should be understood that the laser sight 625 and the flashlight 630 are examples of peripheral components, but the gun 600 may include additional or alternative peripheral components.

A user may provide user input via a user interface, and the gun 600 may modify the behavior of one or more peripheral components based on the user input. For example, the user may press the button 605 to toggle the laser sight 625 on and off. In other words, pressing the button 605 while the laser sight 625 is powered on would result in the laser sight 625 being powered off, and pressing the button 605 while the laser sight 625 is powered on would result in the laser sight 625 being powered off. As another example, the user may adjust the slider 610 to modify the brightness of the flashlight 630. Examples of functions which may be performed by peripheral components of the gun 600 include powering a peripheral component on, powering a peripheral component off, adjusting the brightness of a peripheral component, illuminating a peripheral component with a predetermines color of light, pulsing a peripheral component according to a light pulse pattern, pulsing a haptic motor according to a tactile pulse pattern, and generating an audio tone.

A user may configure aspects of the user interface of the gun 600. As part of the configuration procedure, the user may configure the button 605 such that applying pressure to the button 605 results in a peripheral component of the gun 600 performing a desired function. In other words, the user may configure or define the action performed in response to the button 605 being pressed. For example, a first user may configure the action of the button 605 as toggling the laser sight 625 on and off, while a second user may define the action of the button 605 as toggling the flashlight 630 on and off. As such, the gun 600 may determine the identity of the user based on a user authentication procedure, retrieve a configuration file indicating the action the user configured the button 605 to perform, and perform the action based on the configuration file indicating the action and in response to the button 605 being pressed.

The processor 615 may generate an output, and the function performed by a peripheral component may be modified based on the output. In some examples, a peripheral component may perform a function based on a logical condition being satisfied. For example, a user may configure the flashlight 630 to turn on when (i) the gun 600 is in the home of the user and (ii) the gun 600 is in a dark setting. As a result, the gun 600 may automatically turn on the flashlight 630 based on the processor 615 generating an output indicating that the gun 600 is located within the home of the user and in a dark setting. The processor 615 may generate the output in response to determining that the gun 600 is connected to a home Wi-Fi network or based on determining that a global positioning system (GPS) coordinate of the gun 600 is within a geographic area corresponding to the geographic area of the home. The processor 615 may generate the output in response to the ambient light sensor 620 indicating that a low-light threshold is satisfied. The ambient light sensor 620 may indicate that the low-light threshold is satisfied by generating an ambient light sensor output (e.g., an interrupt). In some examples, the ambient light sensor 620 may generate an ambient light sensor output based on determining that a high-light threshold is satisfied, and the brightness of the peripheral component may be increased based on the ambient light sensor output.

Figure 7:
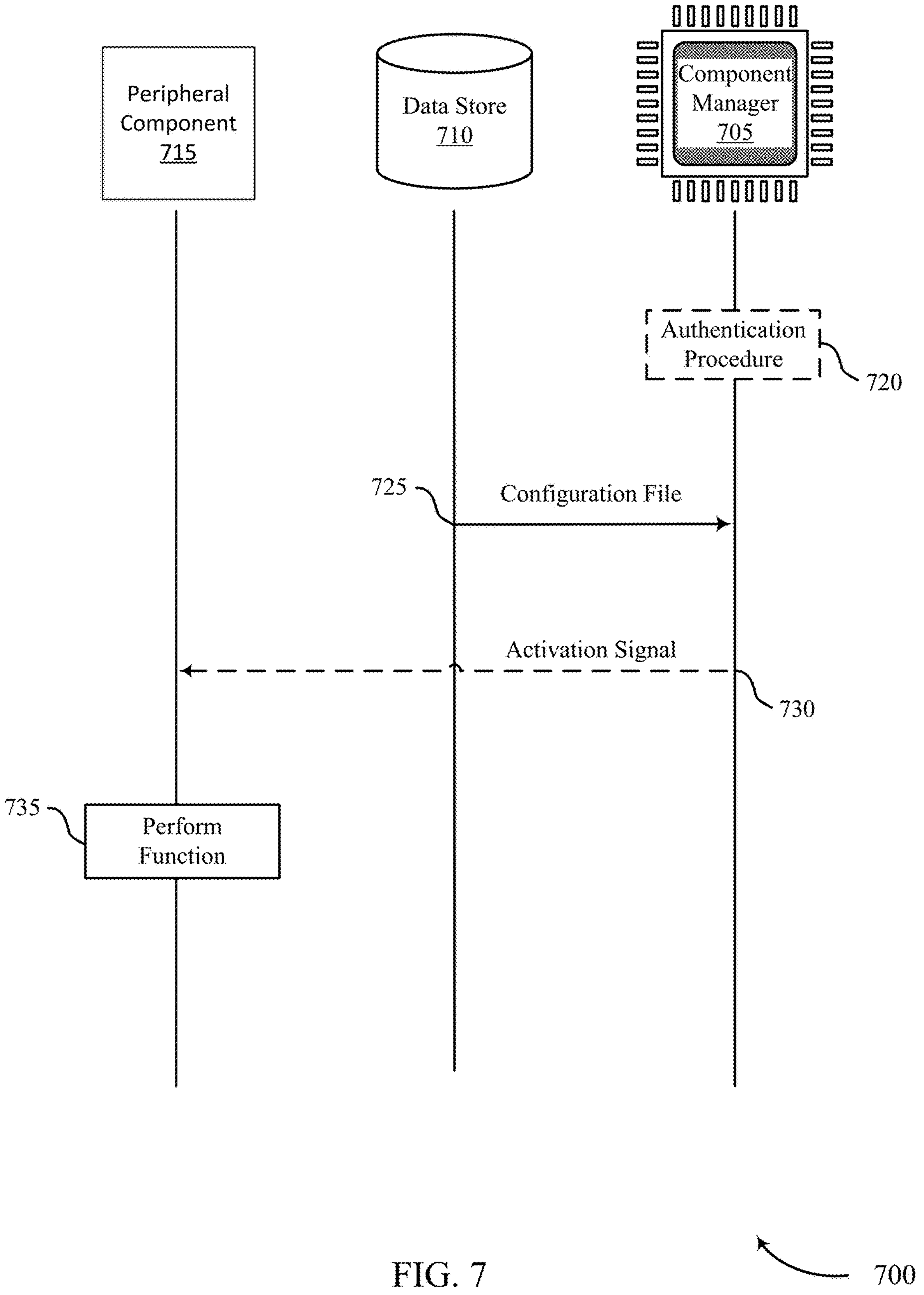
FIG. 7 illustrates an example of a process flow for dynamically operating a peripheral component.

FIG. 7 illustrates an example of a process flow 700 for dynamically operating a peripheral component in accordance with aspects of the present disclosure. The process flow 700 includes a component manager 705, a data store 710, and a peripheral component 715, which may be examples of the corresponding components described with reference to FIGS. 1 through 6. The component manager 705 may be an example of a processor or a controller, and the data store 710 may be an example of non-volatile memory. Alternative examples of the following may be implemented, where some steps are performed in a different order than described or are not performed at all. In some cases, steps may include additional features not mentioned below, or further steps may be added.

At step 720, the component manager 705 may perform an authentication procedure to identify the user operating the gun. The authentication procedure may be performed by the component manager 705, or the authentication procedure may be performed by an authentication manager and the component manager may receive an output from the authentication manager. The authentication manager may be an example of a processor, an application-specific integrated circuit (ASIC), a graphics processing unit (GPU), or the like. The user may be holding the gun or in physical control of the gun, and identifying the user may include identifying a user profile that is associated with the user. The user profile may be identified by matching query data to enrollment data. Authentication data received as part of a user authentication procedure may be referred to as "query data," and authentication data received as part of an enrollment procedure may be referred to as "enrollment data."

The component manager 705 may retrieve a configuration file 725 from the data store 710. The component manager 705 may retrieve the configuration file 725 based on an output of the authentication procedure, such as an output indicating a user profile, an output indicating the identity of the user, or an output indicating that the user is authorized to operate the gun. For example, the configuration file 725 may be an example of, or include aspects of, a user profile containing a peripheral component configuration.

The configuration file 725 may indicate a function, and the peripheral component 715 may perform the function at step 735 based on the configuration file 725 indicating the function. For example, the component manager 705 may transmit the activation signal 730 to the peripheral component 715 to indicate the function to perform, and the peripheral component 715 may perform the function in response to the activation signal 730. In some examples, the configuration file 725 may include functions and associated priorities for the functions. The configuration file 725 may indicate one or more functions, and the component manager 705 may identify the function with the highest priority to perform at the peripheral component 715. As such, the activation signal 730 may indicate a function to perform and an associated priority of the function.

The function performed by the peripheral component 715 at step 735 may be determined based on the configuration file 725, the activation signal 730, or both. In some examples, the component manager 705 may refrain from transmitting the activation signal 730. For example, the component manager 705 may determine that the peripheral component 715 should not be activated, and the component manager 705 may refrain from transmitting the activation signal 730 to cause the peripheral component 715 to remain in a powered-down state.

The configuration file 725 may define a threshold, such as a low-light threshold or a high-light threshold, and the function performed by the peripheral component may be based on the threshold. An example of a low-light threshold is 0.05 lux (lx), 0.1 lx, 0.25 lx, 0.5 lx, 1 lx, 2 lx, 3 lx, or anywhere in between. An example of a bright-light threshold is 200 lx, 500 lx, 1000 lx, 10,000 lx, 50,000 lx, 100,000 lx, or anywhere in between. The low-light threshold may be satisfied based on the ambient light sensor measuring an amount of light that is lower than the low-light threshold, and the bright-light threshold may be satisfied based on the ambient light sensor measuring an amount of light that is higher than the bright-light threshold.

The function performed by the peripheral component 715 may be modified in response to sensor input or user input. For example, a user may press a button to toggle the power state of the peripheral component 715, and the peripheral component 715 may be turned off in response to the user providing the user input via the button. As another example, an ambient light sensor may measure ambient light and generate an indication of the amount of light measured, and the brightness of the peripheral component 715 may be modified based on the indication of the amount of light measured. The component manager 705 may determine that the amount of light measured satisfies a low-light threshold, and the component manager 705 may reduce the brightness of the peripheral component based on the low-light threshold being satisfied. The component manager 705 may determine that the amount of light measured satisfies a high-light threshold, and the component manager 705 may increase the brightness of the peripheral component based on the high-light threshold being satisfied.

Figure 8:
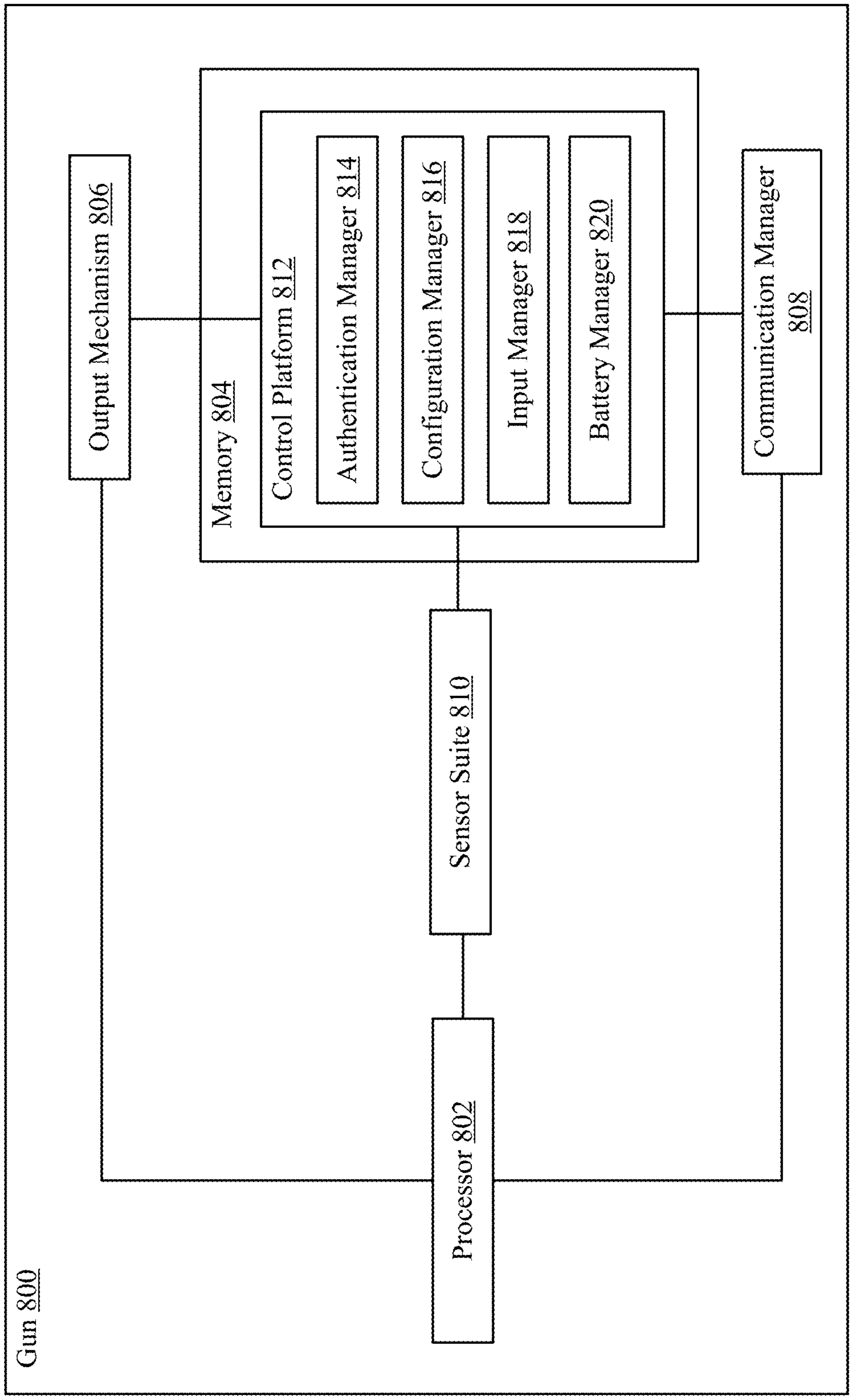
FIG. 8 illustrates an example of a gun that dynamically operates peripheral components.

FIG. 8 illustrates an example of a gun 800 that dynamically operates peripheral components in accordance with aspects of the present disclosure. The gun 800 is able to implement a control platform 812 designed to produce outputs that are helpful in ensuring the gun 800 is functions in a manner intended by the user. As further discussed below, the control platform 812 (also referred to as a "management platform" or a "component manager") may be designed to manage the functions performed by peripheral components of the gun 800.

In some embodiments, the control platform 812 is embodied as a computer program that is executed by the gun 800.

In other embodiments, the control platform 812 is embodied as an electrical circuit that performs logical operations of the gun 800. In yet other embodiments, the control platform 812 is embodied as a computer program that is executed by a computing device to which the gun 800 is communicatively connected. In such embodiments, the gun 800 may transmit relevant information to the computing device for processing as further discussed below. Those skilled in the art will recognize that aspects of the computer program could also be distributed amongst the gun 800 and computing device.

The gun 800 can include a processor 802, memory 804, output mechanism 806, and communication manager 808. The processor 802 can have generic characteristics similar to general-purpose processors, or the processor 802 may be an application-specific integrated circuit (ASIC) that provides control functions to the gun 800. As shown in FIG. 8, the processor 802 can be coupled with all components of the gun 800, either directly or indirectly, for communication purposes.

The memory 804 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 802, the memory 804 can also store data generated by the processor 802 (e.g., when executing the managers of the control platform 812). Note that the memory 804 is merely an abstract representation of a storage environment. The memory 804 could be comprised of actual memory chips or managers.

The output mechanism 806 can be any component that is capable of conveying information to a user of the gun 800. The output mechanism may be an example of a peripheral component. For example, the output mechanism 806 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 800. Thus, the display may indicate whether the gun 800 is presently in a locked state, unlocked state, etc. As another example, the output mechanism 806 may be a loudspeaker (or simply "speaker") that is able to audibly convey information to the user. As yet another example, the output mechanism may be a haptic motor that is able to tactilely convey information to the user.

The communication manager 808 may be responsible for managing communications between the components of the gun 800. For example, the communication manager 808 may receive input from a user interface or a sensor, process the input to determine a function to perform at a peripheral component, and transmit a signal to the peripheral component to cause the peripheral component to perform the function. Additionally or alternatively, the communication manager 808 may be responsible for managing communications with computing devices that are external to the gun 800. Examples of computing devices include mobile phones, tablet computers, wearable electronic devices (e.g., fitness trackers), and network-accessible server systems comprised of computer servers. Accordingly, the communication manager 808 may be wireless communication circuitry that is able to establish communication channels with computing devices. Examples of wireless communication circuitry include integrated circuits (also referred to as "chips") configured for Bluetooth, Wi-Fi, NeNFC, and the like.

Sensors are normally implemented in the gun 800. Collectively, these sensors may be referred to as the "sensor suite" 810 of the gun 800. For example, the gun 800 may include a motion sensor whose output is indicative of motion of the gun 800 as a whole. Examples of motion sensors include multi-axis accelerometers and gyroscopes. As another example, the gun 800 may include a proximity sensor whose output is indicative of proximity of the gun 800 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the gun 800 may include a fingerprint sensor or camera that generates images which can be used for, for example, biometric authentication. As another example, the gun 800 may include an ambient light sensor, which may be used to measure ambient light for the purpose of adjusting the brightness of one or more peripheral components of the gun 800. As shown in FIG. 8, outputs produced by the sensor suite 810 may be provided to the control platform 812 for examination or analysis.

For convenience, the control platform 812 may be referred to as a computer program that resides in the memory 804. However, the control platform 812 could be comprised of software, firmware, or hardware components that are implemented in, or accessible to, the gun 800. In accordance with embodiments described herein, the control platform 812 may include authentication manager 814, configuration manager 816, input manager 818, and battery manager 820. As an illustrative example, the authentication manager 814 may process data generated by, and obtained from, a biometric sensor, the configuration manager 816 may process configuration files received from a data store of the gun 800, the input manager 818 may process data obtained from a button or an ambient light sensor, and the battery manager 820 may process data obtained from a power manager. Because the data obtained by these managers may have different formats, structures, and content, the instructions executed by these managers can (and often will) be different. For example, the instructions executed by the authentication manager 814 to process data generated by a biometric sensor may be different from the instructions generated by the configuration manager 816 to process data in a configuration file. As a specific example, the authentication manager 814 may implement image processing algorithms (e.g., for denoising, despeckling, facial recognition, etc.) that are not necessary for processing XML data or JSON data in a configuration file.

Figure 9:
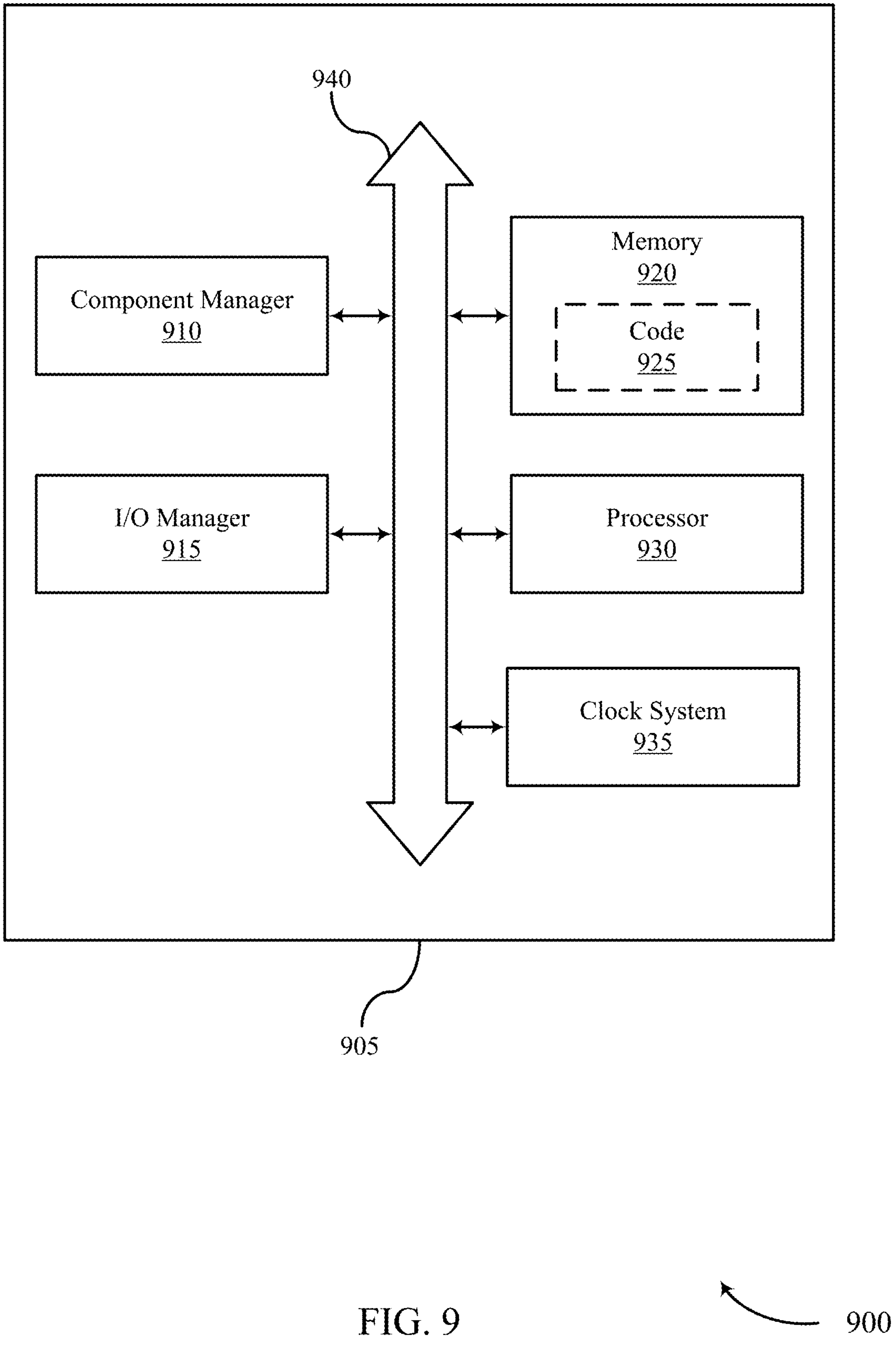
FIG. 9 illustrates an example of a system that supports dynamically operating peripheral components in accordance with aspects of the present disclosure.

FIG. 9 illustrates an example of a system 900 that supports dynamically operating peripheral components in accordance with aspects of the present disclosure. The device 905 may be operable to implement the techniques, technology, or systems disclosed herein. The device 905 may include components such as a component manager 910, an input/output (I/O) manager 915, memory 920, code 925, a processor 930, a clock system 935, and a bus 940. The components of the device 905 may communicate via one or more buses 940. The device 905 may be an example of, or include aspects of, a gun or a peripheral component.

The component manager 910 may retrieve a configuration file from the memory 920 in response to a determination that an authentication procedure is complete. In some examples, the component manager 910 may receive an indication of a user profile determined as part of the authentication procedure, and the component manager 910 may retrieve a configuration file based on the user profile. The component manager 910 may cause a function to be performed at the peripheral component based on the configuration file indicating that the function is to be performed for the user.

The component manager 910 may receive, via a user interface, a selection of a function that is to be performed at a peripheral component of the device 905 for a user and store, in a data structure in the memory 920, an indication that the function is to be performed at the peripheral component of the device 905 for the user. The selection of the function may be received as part of a configuration procedure. In some examples, the component manager 910 may receive the selection of the function based on determining that the user is authorized to operate the device 905.

The I/O manager 915 may manage input and output signals for the device 905. The I/O manager 915 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 920 may include or store code (e.g., software) 925. The memory 920 may include volatile memory, such as random-access memory (RAM) and/or non-volatile memory, such as read-only memory (ROM). The code 925 may be computer-readable and computer-executable, and when executed, the code 925 may cause the processor 930 to perform various operations or functions described here.

The processor 930 may be an example or component of a central processing unit (CPU), an application specific integrated circuit (ASIC), or a field programmable gate array (FPGA). In some embodiments, the processor 930 may utilize an operating system or software such as Microsoft Windows®, iOS®, Android®, Linux®, Unix®, or the like. The clock system 935 control a timer for use by the disclosed embodiments.

The component manager 910, or its sub-components, may be implemented in hardware, software (e.g., software or firmware) executed by a processor, or a combination thereof. The component manager 910, or its sub-components, may be physically located in various positions. For example, in some cases, the component manager 910, or its sub-components may be distributed such that portions of functions are implemented at different physical locations by one or more physical components.

Figure 10:
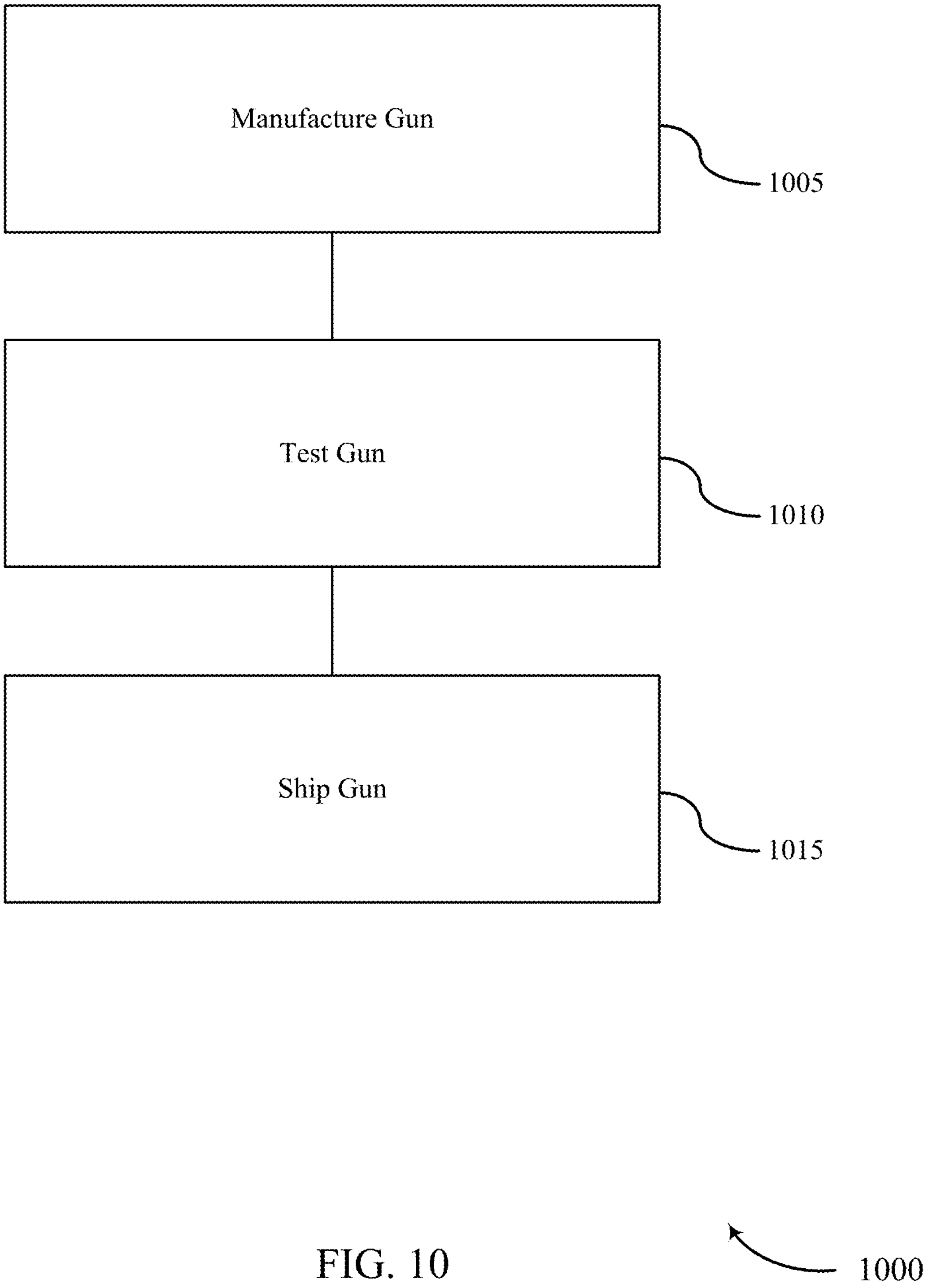
FIG. 10 illustrates an example of a flowchart showing a method of manufacturing a gun that includes peripheral components.

FIG. 10 illustrates an example of a flowchart showing a method 1000 of manufacturing a gun that supports dynamically operating peripheral components in accordance with aspects of the present disclosure. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1005). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. In some examples, the manufacturer may manufacture the gun to include one or more peripheral components, which may be integrated into the gun or removably coupled with the gun. Often, the manufacturer will obtain some parts and make other parts that are assembled together to form the gun (or a component of the gun).

The manufacturer may develop peripheral components, and the peripheral components may be fastened to, or integrated into, a gun. The manufacturer may also develop instructions that support dynamically operating the peripheral components. For example, the manufacturer may produce software and/or firmware that supports performing functions at peripheral components of a gun.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1010). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test the barrel to verify that it meets a precision threshold and the cartridge feed system to verify that it meets a reliability threshold. As another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

Testing the gun may include testing software and/or firmware. The manufacturer may test the software and/or firmware to validate the security, performance, or reliability of the software and/or firmware. In some examples, the software may be submitted to one or more third-party entities to audit the software and/or firmware. The software and/or firmware may be tested with emulation tools that simulate the peripheral components of the gun, or the software and/or firmware may be tested on the peripheral components of the gun. In response to testing, the software and/or firmware may be deployed to the gun.

Thereafter, the manufacturer may ship the gun to a dealer (step 1015). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1005 and 1010 either sequentially or simultaneously (e.g., one component may be tested while another component is added to the gun). Thus, the descriptions of these processes are intended to be open ended.

Figure 11:
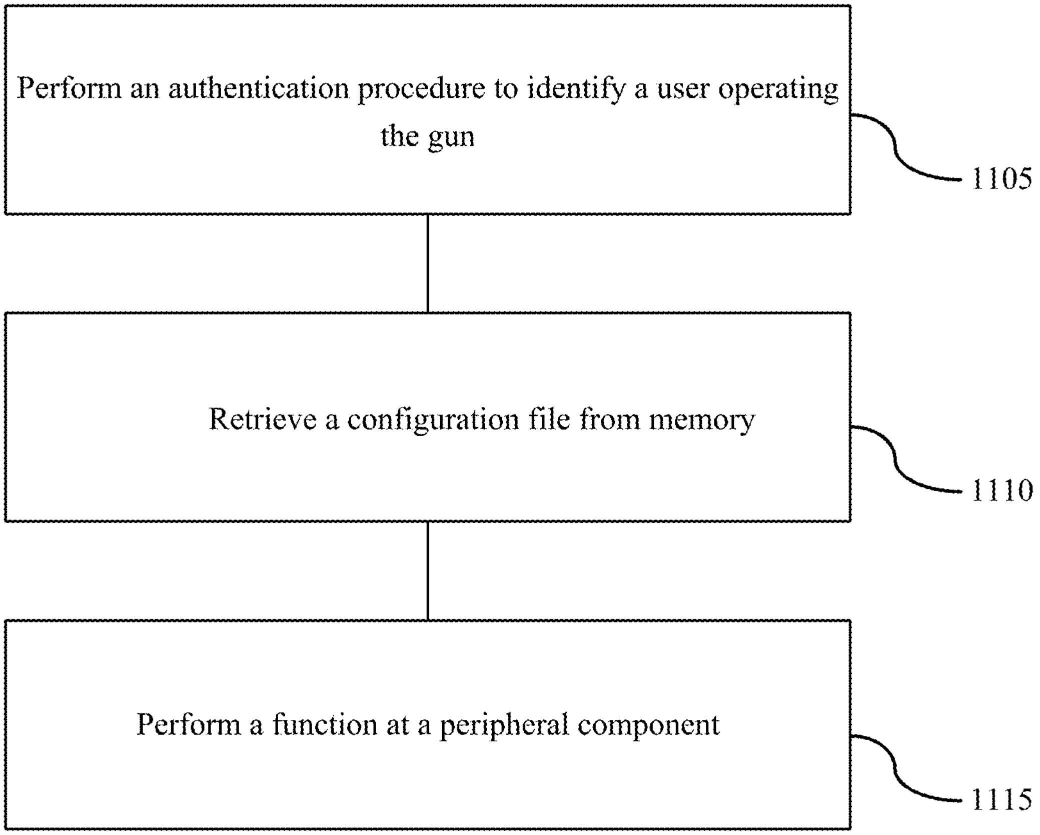
FIG. 11 illustrates an example of a flowchart showing a method of dynamically operating a peripheral.

FIG. 11 illustrates an example of a flowchart showing a method 1100 of dynamically operating a peripheral component in accordance with aspects of the present disclosure. The operations of the method 1100 may be implemented by a gun or by aspects of a gun described herein. For example, the operations of the method 1100 may be performed by a processor, a controller, or a component manager described herein. In some examples, a gun may execute a set of instructions to control the functional elements of the to perform the described functions. Additionally or alternatively, the gun may perform aspects of the described functions using special-purpose hardware.

At step 1105, a gun may perform an authentication procedure to identify a user operating the gun. For example, the gun may collect query data and identify the user by matching the query data to enrollment data. The enrollment data may be associated with, or an aspect of, a user profile.

At step 1110, the gun may retrieve a configuration file from memory. The memory may be non-volatile memory, such as ROM, Flash, ferroelectric random-access memory (FRAM), or the like. The memory may be housed inside the gun, such as on a circuit board that embedded inside a grip module of the or underneath the barrel. The configuration file may include the user profile of the identified user, and the user profile may indicate one or more functions.

At step 1115, the gun may perform a function at the peripheral component of the gun. An output of the authentication procedure may indicate the identity of the user, the configuration file may indicate the function to perform for the user, and the gun may perform the function at the peripheral component. As an illustrative example, in response to the authentication procedure, the gun may retrieve the configuration file, identify the user profile indicating the function, and determine that the function is to be performed at a peripheral As some illustrative examples of functions that may be performed at the peripheral component, the gun may generate a haptic pulse pattern based on the configuration file indicating the pulse pattern, illuminate an aiming sight with a color based on the configuration file indicating the color, illuminate an LED with a color based on the configuration file indicating the color, generate a sound based on the configuration file indicating the sound, display an icon at a display panel based on the configuration file indicating the icon, etc.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 12:
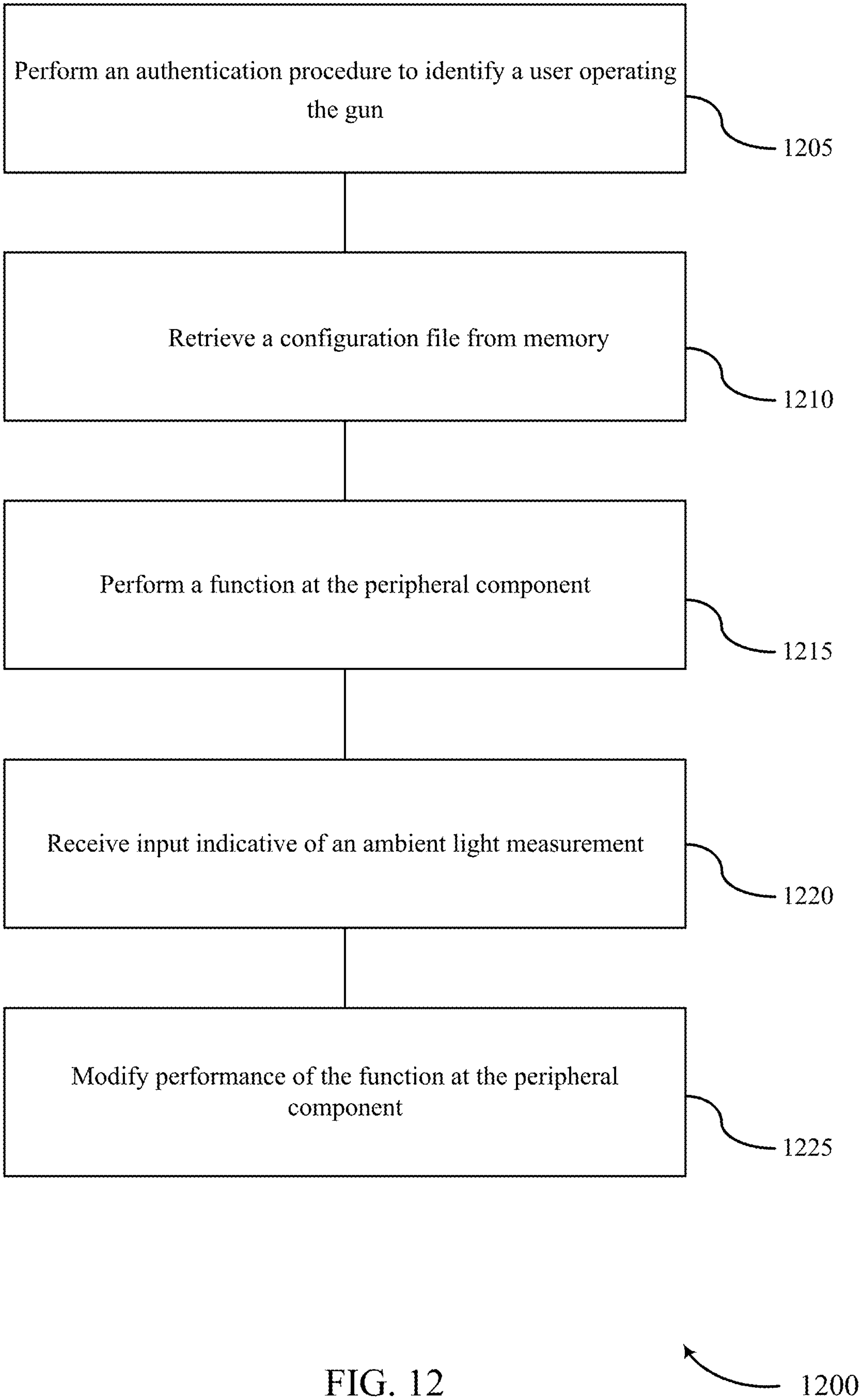
FIG. 12 illustrates an example of a flowchart showing a method of dynamically operating a peripheral component.

FIG. 12 illustrates an example of a flowchart showing a method 1200 of dynamically operating a peripheral component in accordance with aspects of the present disclosure. The operations of the method 1200 may be implemented by a gun or by aspects of a gun described herein. For example, the operations of the method 1200 may be performed by a processor, a controller, or a component manager described herein. In some examples, a gun may execute a set of instructions to control the functional elements of the to perform the described functions. Additionally or alternatively, the gun may perform aspects of the described functions using special-purpose hardware.

At step 1205, a gun may perform an authentication procedure to identify a user operating the gun. The gun may identify the user based on the authentication procedure and determine that the user is authorized to operate the gun.

At step 1210, the gun may retrieve a configuration file from memory. The configuration file may be a configuration file indicating peripheral component preferences for the user. In some examples, each user authorized to operate the gun may be associated with a configuration file, while in some other examples, a configuration file may include peripheral component preferences for multiple users.

At step 1215, the gun may perform a function at the peripheral component of the gun. The configuration file may indicate that the function is to be performed for the user, and the function may be performed based on the configuration file indicating that the function is to be performed for the user.

At step 1220, the gun may receive input indicative of an ambient light measurement. The input may, for example, indicate a discrete measurement of light. In some examples, the input may indicate an illuminance value measured in lux.

At step 1225, then gun may modify the function at the peripheral component. For example, the gun may increase the brightness of the peripheral component based on the input indicating that a measurement of light satisfies a high-light threshold. As another example, the gun may decrease the brightness of the peripheral component based on the input indicating that a measurement of light satisfies a low-light threshold.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 13:
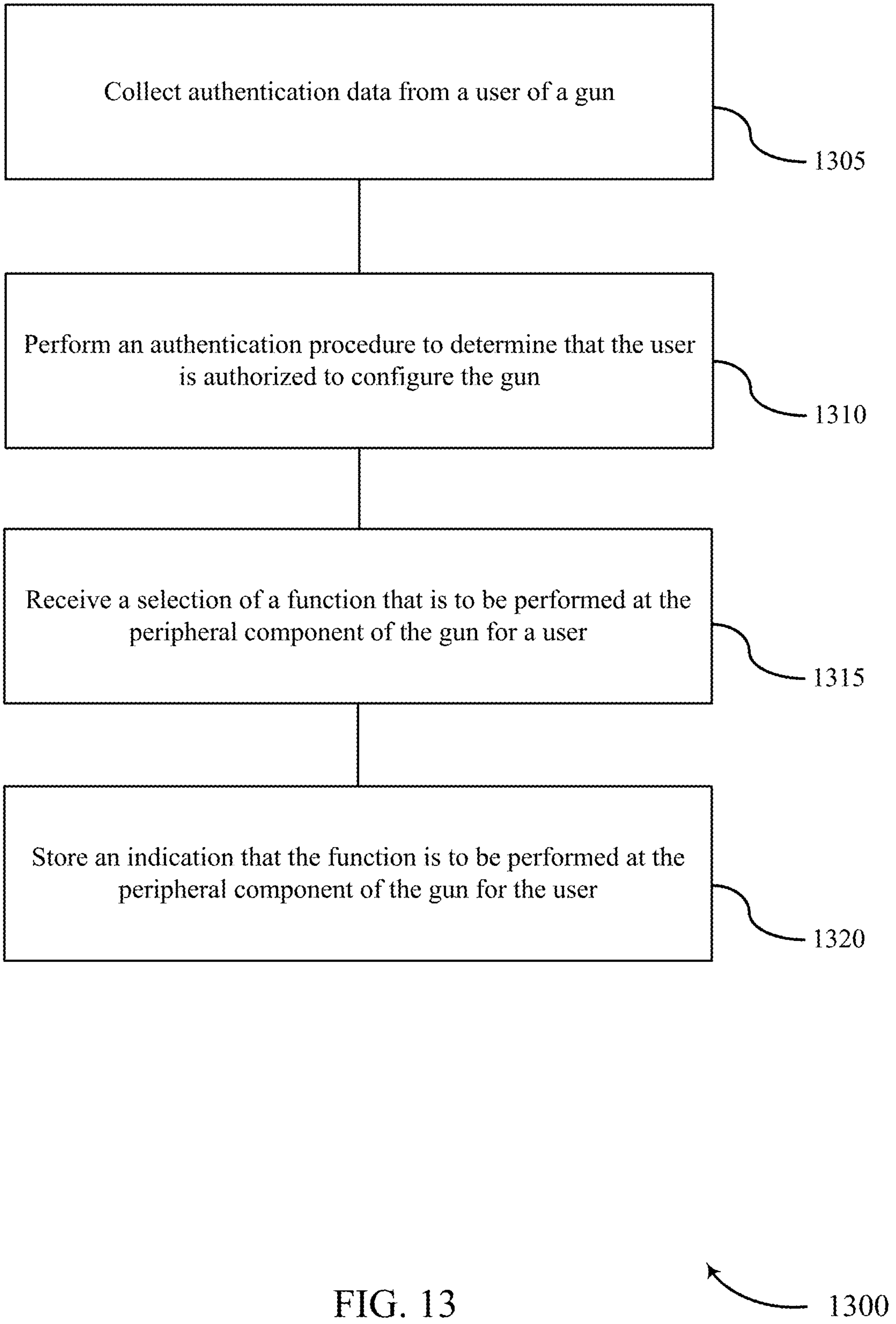
FIG. 13 illustrates an example of a flowchart showing a method of configuring a peripheral component for dynamic operation.

FIG. 13 illustrates an example of a flowchart showing a method 1300 of configuring a peripheral component for dynamic operation in accordance with aspects of the present disclosure. The operations of the method 1300 may be implemented by a gun or by aspects of a gun described herein. For example, the operations of the method 1300 may be performed by a processor, a controller, or a component manager described herein. In some examples, a gun may execute a set of instructions to control the functional elements of the to perform the described functions. Additionally or alternatively, the gun may perform aspects of the described functions using special-purpose hardware.

At step 1305, the gun may collect authentication data from a user of the gun. The authentication data may include biometric data, token data, or both. Biometric data may include fingerprint data, palmprint data, vein pattern data, facial data, iris data, voice data, grip pressure data, or the like. Token data may include a digital signature or a unique identifier, such as a digital identifier received as part of an NFC protocol, an RFID protocol, a Bluetooth protocol, or the like. The authentication data may be collected as part of a user authentication procedure, and the authentication data may be referred to as query data.

At step 1310, the gun may perform an authentication procedure to determine that the user is authorized to configure the gun. The gun may determine that the authentication data corresponds to a user with an administrative privileges, and the gun may determine that the user is authorized to configure the gun based on the administrative privileges. In some examples, the gun may determine that the authentication data corresponds to a user associated with an "owner" permission level, and the gun may determine that the user is authorized to configure the gun based on the "owner" permission level. As an example, the user may be the owner of the gun, and the gun may determine that the user is authorized to configure the gun in based on determining that the user is the owner of the gun.

At step 1315, the gun may receive a selection of a function that is to be performed at the peripheral component of the gun for a user. For example, the user may select a function from a drop-down menu of a user interface, and the gun may receive the selection of the function.

At step 1320, the gun may store an indication that the function is to be performed at the peripheral component of the gun for the user. The indication may be a value stored in a data structure. For example, the indication may be stored in an object of a JSON file, an array of a JSON file, or a tree of an XML file.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Examples

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method of dynamically operating a peripheral component of a gun, the method including: receiving authentication data that is associated with a user who has indicated an interest in operating the gun; performing an authentication procedure to verify an identity of the user based on the authentication data; retrieving a configuration file from memory of the gun in response to a determination that the authentication procedure is complete, the configuration file indicating a peripheral component configuration for the user; determining a function to perform at the peripheral component based on the configuration file indicating that the function is to be performed for the user; and performing the function at the peripheral component based on the configuration file, wherein the function includes powering on the peripheral component.

In some examples, the techniques described herein relate to a method of dynamically operating a peripheral component of a gun, the method including: performing an authentication procedure to identify a user operating the gun; retrieving a configuration file from memory of the gun in response to a determination that the authentication procedure is complete; and performing a function at the peripheral component based on the configuration file indicating that the function is to be performed for the user.

In some examples, the techniques described herein relate to a method, wherein the authentication procedure includes: collecting biometric data generated by a biometric sensor of the gun; and determining an identity of the user based on an analysis of the biometric data.

In some examples, the techniques described herein relate to a method, wherein the authentication procedure includes: collecting token data generated by an authentication sensor of the gun; and determining an identity of the user based on an analysis of the token data.

In some examples, the techniques described herein relate to a method, further including: receiving input data from a user interface mechanism of the gun; terminating, based on the input data, performance of the function at the peripheral component; and performing, based on the input data, a different function at the peripheral component.

In some examples, the techniques described herein relate to a method, further including: receiving input indicative of an ambient light measurement output by an ambient light sensor of the gun; and modifying, based on the ambient light measurement, performance of the function at the peripheral component.

In some examples, the techniques described herein relate to a method, wherein the modifying includes altering a brightness of the peripheral component, wherein an amount of alternation is based on the ambient light measurement.

In some examples, the techniques described herein relate to a method, further including: receiving input indicative of a value output by a proximity sensor of the gun; determining, based on the value, that a user presence loss event has occurred; and terminating the function in response to the user presence loss event.

In some examples, the techniques described herein relate to a method, further including: determining a state of the gun, wherein the function is performed based on the state of the gun.

In some examples, the techniques described herein relate to a method, wherein the state of the gun includes a low-battery state, an actively charging state, a low-light state, a high-light state, or any combination thereof.

In some examples, the techniques described herein relate to a method, wherein the state of the gun is based on an ambient light sensor of the gun indicating an amount of ambient light, a global positioning system coordinate of the gun indicating a location, a system clock of the gun indicating a time of day, or any combination thereof In some examples, the techniques described herein relate to a method, further including: performing a second authentication procedure to identify a second user of the gun; and performing a second function at the peripheral component based on the configuration file indicating that the second function is to be performed for the second user.

In some examples, the techniques described herein relate to a method, further including: collecting authentication data from the second user of the gun; wherein the second authentication procedure determines that the authentication data matches enrollment data stored in memory of the gun.

In some examples, the techniques described herein relate to a method, wherein the authentication data includes biometric data or token data.

In some examples, the techniques described herein relate to a method, wherein the function includes turning a flashlight on, turning the flashlight off, turning a laser on, turning the laser off, modifying the flashlight brightness, modifying the laser brightness, turning an aiming sight on, turning the aiming sight off, turning a display panel on, turning the display panel off, modifying a brightness of the aiming sight, modifying a brightness of the display panel, emitting a predetermined color of light at a light pipe, generating an audible tone, or generating a haptic pulse.

In some examples, the techniques described herein relate to a method, further including: illuminating an aiming sight of the gun such that the aiming sight glows according to a color of light, wherein the function includes the illuminating, wherein the peripheral component includes the aiming sight, and wherein the configuration file indicates that the aiming sight is to be illuminated with the color for the user.

In some examples, the techniques described herein relate to a method, further including: shaking a haptic motor of the gun, wherein the function includes the shaking, wherein the peripheral component includes the haptic motor, and wherein the configuration file indicates that the haptic motor is to shake for the user.

In some examples, the techniques described herein relate to a method, further including: determining a number of cartridges present in the gun; and displaying a numeric value on a display panel of the gun, the numeric value indicating the number of cartridges present in the gun, wherein the function includes the displaying, wherein the peripheral component includes the display panel, and wherein the configuration file indicates that the display panel is to display the numeric of cartridges present in the gun for the user.

In some examples, the techniques described herein relate to a method, wherein the peripheral component includes a laser, a flashlight, an aiming sight, a display panel, a haptic motor, a speaker, or any combination thereof In some examples, the techniques described herein relate to a method of configuring a peripheral component of a gun, the method including: receiving, through a user interface, a selection of a function that is to be performed at the peripheral component of the gun for a user; and storing, in a data structure in memory of the gun, an indication that the function is to be performed at the peripheral component of the gun for the user.

In some examples, the techniques described herein relate to a method, further including: collecting authentication data from the user of the gun; and performing, based on the authentication data, an authentication procedure to determine that the user is authorized to configure the gun; wherein the storing the indication is in response to the performing the authentication procedure.

In some examples, the techniques described herein relate to a method, wherein the authentication data includes biometric data.

In some examples, the techniques described herein relate to a method, wherein the biometric data includes fingerprint data, palmprint data, facial data, iris data, vein pattern data, impedance data.

In some examples, the techniques described herein relate to a method, wherein the authentication data includes token data.

In some examples, the techniques described herein relate to a method, wherein the token data includes a digital identifier transmitted via an RFID protocol, an NFC protocol, a Bluetooth protocol, a Wi-Fi protocol, a 4G protocol, or a 5G protocol.

In some examples, the techniques described herein relate to a method, wherein the token data includes a digital identifier transmitted over an unlicensed radio frequency spectrum region or over a licensed radio frequency spectrum region.

In some examples, the techniques described herein relate to a method, further including: displaying a list of multiple functions that the peripheral component is capable of performing, wherein the receiving the selection of the function is a result of the user selecting the function from the list of multiple functions.

In some examples, the techniques described herein relate to a method, further including: displaying a list of multiple peripheral components of the gun, wherein the receiving the selection of the function is a result of the user selecting the peripheral component from the list of multiple peripheral components.

In some examples, the techniques described herein relate to a method of operating a peripheral component of a gun, the method including: obtaining, by the gun, data that is associated with a user who has indicated an interest in operating the gun, performing, by the gun, an authentication procedure so as to verify an identity of the user based on an analysis of the data, retrieving, by the gun, a configuration file associated with a peripheral component of the gun in response to completing the authentication procedure, and causing, by the gun, a function to be performed at the peripheral component in accordance with the configuration file.

Remarks

The Detailed Description provided herein, in connection with the figures, describes example configurations and does not represent all the examples that may be implemented or that are within the scope of the claims. The term “example” used herein means “serving as an illustration or instance,” and not “a preferred example.”

The functions described herein may be implemented with a controller. A controller may include a component manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term “left” means the left side of the gun when the gun is held in an upright position, where the term “upright position” generally refers to a scenario in which the gun is oriented as if in a high-ready position with the barrel roughly parallel to the ground. The term “right” means the right side of the gun when the gun is held in the upright position. The term “front” means the muzzle end (also referred to as the “distal end”) of the gun, and the term “back” means the grip end (also referred to as the “proximal end”) of the gun. The terms “top” and “bottom” mean the top and bottom of the gun as the gun is held in the upright position. The relative positioning terms such as “left,” “right,”“front,” and “rear” are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method of dynamically operating a peripheral component of a gun, the method comprising:

performing an authentication procedure to identify a user operating the gun;

retrieving a configuration file from memory of the gun in response to a determination that the authentication procedure is complete;

performing a function at the peripheral component based on the configuration file indicating that the function is to be performed for the user;

receiving input indicative of a value output by a proximity sensor of the gun;

determining, based on the value, that a user presence loss event has occurred; and terminating the function in response to the user presence loss event.

2. The method of claim 1, wherein the authentication procedure comprises:

collecting biometric data generated by a biometric sensor of the gun; and determining an identity of the user based on an analysis of the biometric data.

3. The method of claim 1, wherein the authentication procedure comprises:

collecting token data generated by an authentication sensor of the gun; and determining an identity of the user based on an analysis of the token data.

4. The method of claim 1, further comprising:

receiving input data from a user interface mechanism of the gun;

terminating, based on the input data, performance of the function at the peripheral component; and performing, based on the input data, a different function at the peripheral component.

5. The method of claim 1, further comprising:

receiving input indicative of an ambient light measurement output by an ambient light sensor of the gun; and modifying, based on the ambient light measurement, performance of the function at the peripheral component.

6. The method of claim 5, wherein the modifying comprises altering a brightness of the peripheral component, wherein an amount of alternation is based on the ambient light measurement.

7. The method of claim 1, further comprising:

performing a second authentication procedure to identify a second user of the gun; and performing a second function at the peripheral component based on the configuration file indicating that the second function is to be performed for the second user.

8. The method of claim 7, further comprising:

collecting authentication data from the second user of the gun;

wherein the second authentication procedure determines that the authentication data matches enrollment data stored in memory of the gun.

9. The method of claim 8, wherein the authentication data comprises biometric data or token data.

10. The method of claim 1, wherein the function comprises turning a flashlight on, turning the flashlight off, turning a laser on, turning the laser off, modifying the flashlight brightness, modifying the laser brightness, turning an aiming sight on, turning the aiming sight off, turning a display panel on, turning the display panel off, modifying a brightness of the aiming sight, modifying a brightness of the display panel, emitting a predetermined color of light at a light pipe, generating an audible tone, or generating a haptic pulse.

11. The method of claim 1, wherein the peripheral component comprises a laser, a flashlight, an aiming sight, a display panel, a haptic motor, a speaker, or any combination thereof.

12. A method of dynamically operating a peripheral component of a gun, the method comprising:

performing an authentication procedure to identify a user operating the gun;

retrieving a configuration file from memory of the gun in response to a determination that the authentication procedure is complete;

determining a state of the gun; and performing a function at the peripheral component based on (i) the configuration file indicating that the function is to be performed for the user and (ii) the state of the gun.

13. The method of claim 12, wherein the state of the gun comprises a low-battery state, an actively charging state, a low-light state, a high-light state, or any combination thereof.

14. The method of claim 12, wherein the state of the gun is based on an ambient light sensor of the gun indicating an amount of ambient light, a global positioning system coordinate of the gun indicating a location, a system clock of the gun indicating a time of day, or any combination thereof.

15. A method of dynamically operating an aiming sight of a gun, the method comprising:

performing an authentication procedure to identify a user operating the gun;

retrieving a configuration file from memory of the gun in response to a determination that the authentication procedure is complete; and performing a function at the aiming sight based on the configuration file indicating that the function is to be performed for the user, the function comprising illuminating the aiming sight of the gun such that the aiming sight glows according to a color of light indicated in the configuration file.

16. A method of dynamically operating a haptic motor of a gun, the method comprising:

performing an authentication procedure to identify a user operating the gun;

retrieving a configuration file from memory of the gun in response to a determination that the authentication procedure is complete; and performing a function at the haptic motor based on the configuration file indicating that the function is to be performed for the user, the function comprising shaking the haptic motor of the gun.

17. A method of dynamically operating a display panel of a gun, the method comprising:

performing an authentication procedure to identify a user operating the gun;

retrieving a configuration file from memory of the gun in response to a determination that the authentication procedure is complete;

determining a number of cartridges present in the gun; and performing a function at the display panel based on the configuration file indicating that the function is to be performed for the user, the function comprising displaying a numeric value on the display panel of the gun, the numeric value indicating the number of cartridges present in the gun.

18. A method of configuring a peripheral component of a gun, the method comprising:

receiving, through a user interface, a selection of a function that is to be performed at the peripheral component of the gun for a user;

collecting authentication data from the user of the gun;

performing, based on the authentication data, an authentication procedure to determine that the user is authorized to configure the gun; and in response to the performing the authentication procedure, storing, in a data structure in memory of the gun, an indication that the function is to be performed at the peripheral component of the gun for the user.

19. The method of claim 18, wherein the authentication data comprises biometric data.

20. The method of claim 19, wherein the biometric data comprises fingerprint data, palmprint data, facial data, iris data, vein pattern data, impedance data.

21. The method of claim 18, wherein the authentication data comprises token data.

22. The method of claim 21, wherein the token data comprises a digital identifier transmitted via a radio-frequency identification (RFID) protocol, a near-field communication (NFC) protocol, a Bluetooth protocol, a Wi-Fi protocol, a 4G protocol, or a protocol.

23. The method of claim 21, wherein the token data comprises a digital identifier transmitted over an unlicensed radio frequency spectrum region or over a licensed radio frequency spectrum region.

24. The method of claim 18, further comprising:

displaying a list of multiple functions that the peripheral component is capable of performing, wherein the receiving the selection of the function is a result of the user selecting the function from the list of multiple functions.

25. A method of configuring a peripheral component of a gun, the method comprising:

displaying, on a user interface, a list of multiple peripheral components of the gun;

receiving, through the user interface, input indicative of selections of the peripheral component from the list of multiple peripheral components and a function that is to be performed at the peripheral component of the gun for a user; and storing, in a data structure in memory of the gun, an indication that the function is to be performed at the peripheral component of the gun for the user.

* * * * *